US010200634B2

(12) United States Patent
Ouyang et al.

(10) Patent No.: US 10,200,634 B2
(45) Date of Patent: Feb. 5, 2019

(54) VIDEO GENERATION METHOD, APPARATUS AND TERMINAL

(71) Applicant: Tencent Technology (Shenzhen) Company Ltd., Shenzhen (CN)

(72) Inventors: Jinkai Ouyang, Shenzhen (CN); Chao Wang, Shenzhen (CN); Chun Li, Shenzhen (CN); Xiangwen Chen, Shenzhen (CN); Hailiang Yuan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/666,809

(22) Filed: Aug. 2, 2017

(65) Prior Publication Data

US 2017/0332020 A1 Nov. 16, 2017

Related U.S. Application Data

(63) Continuation of application No. PCT/CN2016/072448, filed on Jan. 28, 2016.

(30) Foreign Application Priority Data

Feb. 4, 2015 (CN) .......................... 2015 1 0063653
May 4, 2015 (CN) .......................... 2015 1 0221018

(51) Int. Cl.
*H04N 5/272* (2006.01)
*H04N 5/262* (2006.01)
*G06T 7/194* (2017.01)
*G06T 5/20* (2006.01)
*G10H 1/36* (2006.01)
*H04N 5/91* (2006.01)
(Continued)

(52) U.S. Cl.
CPC .............. *H04N 5/272* (2013.01); *G06T 5/20* (2013.01); *G06T 7/194* (2017.01); *G10H 1/368* (2013.01);
(Continued)

(58) Field of Classification Search
CPC ........ H04N 5/272; H04N 5/262; H04N 5/772; H04N 5/91; H04N 9/8211; G06T 7/194; G06T 5/20; G10H 1/368
See application file for complete search history.

(56) References Cited

U.S. PATENT DOCUMENTS 5,488,428 A 1/1996 Akashi et al.
2003/0063125 A1* 4/2003 Miyajima ............. G06F 3/0481
715/781
(Continued)

FOREIGN PATENT DOCUMENTS

CN 102567031 A 7/2012
CN 103220490 A 7/2013
(Continued)

OTHER PUBLICATIONS

Search Report in International Application No. PCT/CN2016/072448 dated Mar. 24, 2016, 6 pages.
(Continued)

*Primary Examiner* — Hung Q Dang
*Assistant Examiner* — Sunghyoun Park
(74) *Attorney, Agent, or Firm* — Marshall, Gerstein & Borun LLP

(57) ABSTRACT

Embodiments of the present disclosure provide a video generation method, device and terminal. Embodiments of the present disclosure may perform effect processing for the image frames obtained from a video during shooting of the video or after the shooting of the video is finished using the selected video effect template, and compose the processed image frames to obtain the composite video. The problem of only presenting contents shot using a camera during the recording of a song and being not able to provide customized functions satisfying users' requirements may be solved. The effect of performing effect processing for all image frames or partial image frames in the shot video using the video
(Continued)

effect template selected by the user to obtain the composite video satisfying the users' requirements may be achieved.

19 Claims, 11 Drawing Sheets

(51) Int. Cl.
    *H04N 5/77*     (2006.01)
    *H04N 9/82*     (2006.01)

(52) U.S. Cl.
    CPC ............ *H04N 5/262* (2013.01); *H04N 5/772* (2013.01); *H04N 5/91* (2013.01); *H04N 9/8211* (2013.01); *G10H 2220/011* (2013.01)

(56) References Cited

U.S. PATENT DOCUMENTS

2009/0262218 A1* 10/2009 Makii .................... G03B 15/08
                                                                          348/239
2011/0037777 A1* 2/2011 Lindahl ................. G06F 1/1626
                                                                          345/619
2016/0225405 A1* 8/2016 Matias ................. G11B 27/005
2017/0085786 A1* 3/2017 Ishida .................. G11B 27/034
2017/0134654 A1   5/2017 Liu et al.

FOREIGN PATENT DOCUMENTS

| CN | 103686450 A | 3/2014 |
| CN | 103928039 A | 7/2014 |
| CN | 104023192 A | 9/2014 |
| CN | 104967801 A | 10/2015 |
| CN | 104967900 A | 10/2015 |

OTHER PUBLICATIONS

International Preliminary Report on Patentability and Written Opinion in International Application No. PCT/CN2016/072448 dated Aug. 8, 2017, 12 pages.

* cited by examiner

VIDEO GENERATION METHOD, APPARATUS AND TERMINAL

This is a continuation of an International Application No. PCT/CN2016/072448, filed on Jan. 28, 2016, which claims priority of a Chinese Patent Disclosure No. 201510063653.9 filed on Feb. 4, 2015, entitled "Video data processing method and device" and a Chinese Patent Disclosure No. 201510221018.9 filed on May 4, 2015 entitled "Video generation method and device". The full texts of the disclosures are incorporated by reference in the present disclosure.

FIELD OF THE TECHNICAL

The present disclosure relates to a graphic image processing field, and more particularly, to a video generation method, apparatus and terminal.

BACKGROUND

With development of computer technologies, terminals, such as the mobile phone and computer are widely used. Applications on the terminals are becoming more varied and functions of these applications are becoming more and more powerful. Sing application (or called karaoke application) is a common entertainment application.

A user may record video data using the singing application in the process of singing. If image frames are captured during the process of the recording the video data, the image frames and the video data may be combined to generate the video.

In the process of implementing the present disclosure, the inventor notices that the prior art at least has the following disadvantages.

During the above shooting process, the eventually generated video merely show shot content, but cannot provide a customized function satisfying users' requirements.

SUMMARY

An embodiment of the present disclosure may provide a video generation method, device and terminal, to provide users with an effect processing function during shooting of the video.

An embodiment of the present disclosure may provide a video generation method, including:

obtaining image frames from a video during shooting of the video or after the shooting of the video is finished;

obtaining a selected video effect template, which comprises at least one filter and/or at least one foreground video;

performing effect processing for the image frames according to the selected video effect template to generate processed image frames;

composing the processed image frames to generate a composite video.

Another embodiment of the present disclosure may provide a video generation device, including:

a first unit, to obtain image frames from a video during shooting of the video or after the shooting of the video is finished;

a second unit, to obtain a selected video effect template, which comprises at least one filter and/or at least one foreground video;

a third unit, to perform effect processing for the image frames according to the selected video effect template to generate processed image frames; and a fourth unit, to compose the processed image frames to generate a composite video.

Another embodiment of the present disclosure may provide a terminal including one or multiple processors and a storage, wherein the storage stores one or multiple programs, the one or multiple programs are executed by the one or multiple processors, and the one or multiple programs comprise instructions for executing following operations:

obtaining image frames from a video during shooting of the video or after the shooting of the video is finished;

obtaining a selected video effect template, which comprises at least one filter and/or at least one foreground video;

performing effect processing for the image frames according to the selected video effect template to generate processed image frames;

composing the processed image frames to generate a composite video.

In the method provided by this embodiment, the image images may be obtained during the shooting of the video or after the shooting of the video is finished and effect processing may be performed for the image frames using the selected video effect template. The processed image frames may be composed to generate the composite video. The problem of only simply presenting the shot content, but being not able to provide customized functions satisfying users' demand in the shooting process may be solved. The effect of generating the composite video satisfying the users' demand through performing the effect processing for all the image frames or partial image frames in the shot video using the video effect template selected by the user may be achieved.

BRIEF DESCRIPTION OF THE DRAWINGS

To describe the technical solutions of the embodiments of the present invention more clearly, the following briefly introduces the accompanying drawings required for describing the embodiments or the existing technology. Apparently, the accompanying drawings in the following description show only some embodiments of the present invention, and a person of ordinary skill in the art may still derive other drawings from these accompanying drawings without creative efforts.

DESCRIPTION OF EMBODIMENTS

To make the objectives, technical solutions and advantages of the present disclosure more clear, implementation manners of the present disclosure are described in further detail below with reference to the accompanying drawings.

Video generation methods the provided by embodiments of the present disclosure may be implemented by a terminal with capability of shooting and processing audio and video. The terminal may be an electronic device, such as a mobile phone, a tablet computer, a desktop computer or a laptop. Potentially, the terminal may run a singing application, a video shooting application or a video processing application.

Figure 1:
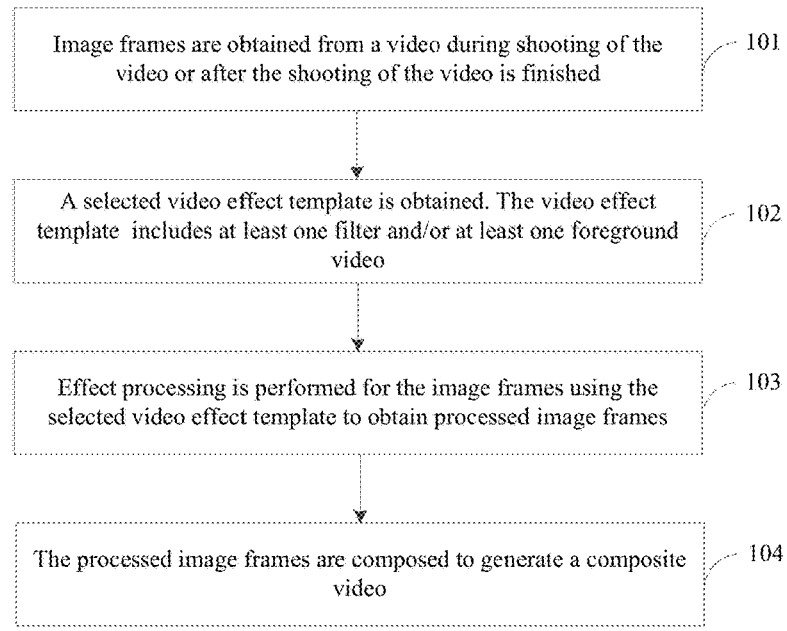
FIG. 1 is a flow chart illustrating a video generation method in accordance with an embodiment of the present disclosure.

Referring to FIG. 1, FIG. 1 is a flow chart illustrating a video generation method in accordance with an embodiment of the present disclosure. The method may include following blocks.

At block 101, image frames may be obtained from a video during shooting of the video or after the shooting of the video is finished.

The image frames may be called images, video data or data, and described as the image frames in embodiments of the present disclosure.

At block 102, a selected video effect template may be obtained. The video effect template may include at least one filter and/or at least one foreground video.

The video effect template may also be called a video effect combination, effect processing template, or a filter. The video effect template may be used in embodiments of the present disclosure.

The foreground video may also be called a video sample. The foreground video may include at least one frame of foreground image. Each frame of foreground image may correspond to a time point. Each frame of foreground image may be used to carry props or elements in the foreground of an image frame corresponding to a time point. The props or elements may include static hearts, static bears or dynamic snowflakes, etc. When dynamic snowflakes are implemented, the foreground video may include several frames of foreground images. Each frame of foreground image may include snowflakes on different positions, so that a snowflake foreground effect, i.e., a snowing state may be implemented.

At block 103, effect processing may be performed for the image frames using the selected video effect template to obtain processed image frames.

The image frames obtained after the above processing may be called the processed image images.

At block 104, the processed image frames may be composed to generate a composite video.

The composite video may also be called composed video data or video data processed with effect.

To sum up, in the method provided by this embodiment, the image images may be obtained during the shooting of the video or after the shooting of the video is finished and effect processing may be performed for the image frames using the selected video effect template. The processed image frames may be composed to generate the composite video. The problem of only simply presenting the shot content, but being not able to provide customized functions satisfying users' demand in the shooting process may be solved. The effect of generating the composite video satisfying the users' demand through performing the effect processing for all the image frames or partial image frames in the shot video using the video effect template selected by the user may be achieved.

It should be noted that in embodiment shown in FIG. 1, effect processing may be performed while the video is shot, or the effect processing may be performed after the shooting of the video is finished.

Another point that should be noted is that when the effect processing of the video effect template only includes processing of one filter, the effect processing may be static filter processing. The effect processing of the video effect template may include the processing of more than one filter, such as processing of multiple combined filters, processing of multiple combined foreground videos, or processing of multiple filters and multiple foreground videos, which may be called dynamic filter processing. Therefore, the embodiment shown in FIG. 1 may at least include following four scenarios.

As for a first scenario, during the shooting of the video, the static filter processing may be performed.

As for a second scenario, after the shooting of the video is finished, the dynamic filter processing may be performed.

As for a third scenario, during the shooting of the video, the dynamic filter processing may be performed.

As for a fourth scenario, after the shooting of the video is finished, the static filter processing may be performed.

Figure 2:
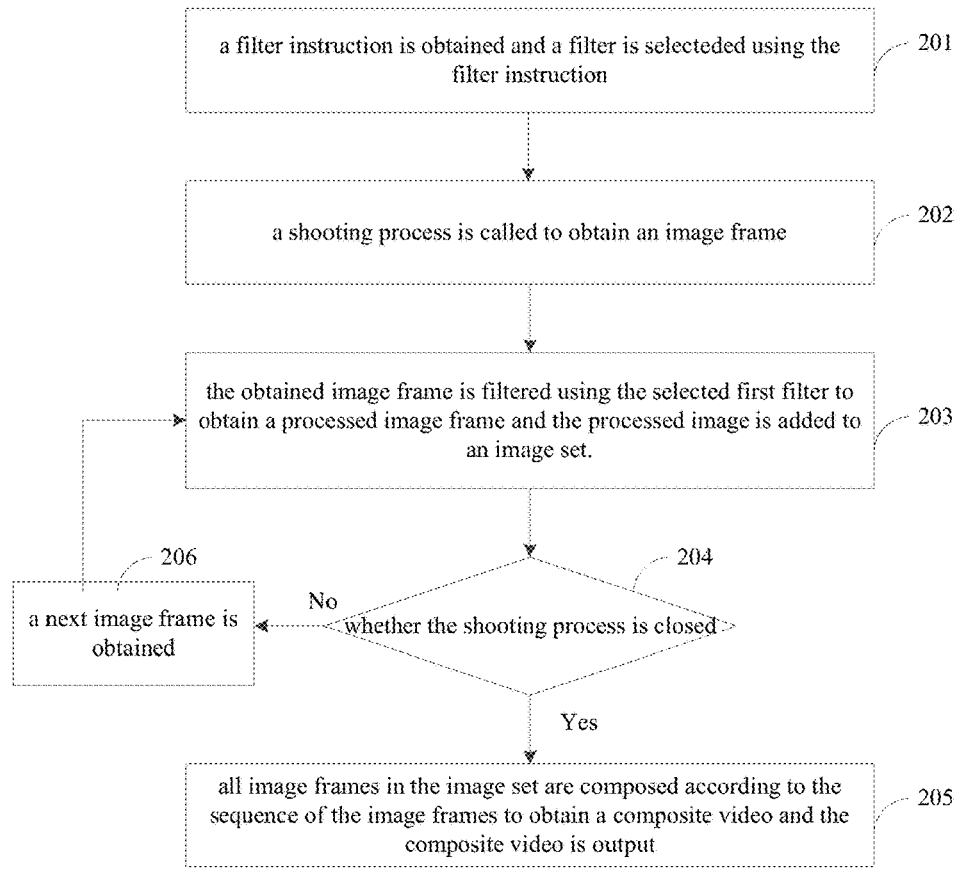
FIG. 2 is a flow chart illustrating a video generation method in accordance with another embodiment of the present disclosure.

First, the above first scenario may be described using an embodiment shown in FIG. 2.

Referring to FIG. 2, FIG. 2 shows a flow chart illustrating a video generation method in accordance with another embodiment of the present disclosure.

At block 201, a filter instruction may be obtained and a filter may be selected using the filter instruction.

For the simplicity, in embodiments of the present disclosure, a default filter or a filter selected by the user may be called a first filter.

The terminal may obtain the filter instruction via several methods, such as, the terminal may receive a shooting request, which may carry the filter instruction and may be triggered by a user, or the terminal may receive the filter instruction input by the user.

In an example that the user may directly input the filter instruction, the terminal may display Identities (ID)s of various filters at the bottom of a page, so that the user may select from the IDs. The page may be a user interface, such as a video shooting page and a song recording page.

When the user touches a filter ID, the filter instruction may be sent to the terminal. The filter instruction may include the filter ID.

The first filter may be configured according to requirements of the actual application. For instance, the first filter may be configured as "documentary", "sweet", "pink" and/or "nostalgic", etc. Wherein, "documentary", "sweet", "pink" and/or "nostalgic" may represent a filter type.

Certainly, the first filter may also be configured as "none" or "original". The video obtained after the processing of the filter with the type of "none" or "original", may be the original video, which may represent that the video may not be processed with the filter.

At block 202, a shooting process may be called to obtain an image frame.

The terminal may receive the shooting request, and call the shooting process to perform the shooting operation to obtain the image frame.

For instance, the terminal may receive the shooting request, which may be generated in response to the triggering of the shooting button on the shooting page by the user. Then, the user may initiate a video shooting engine according to the shooting request to call a shooting process, execute the shooting process and obtain a frame of image via a camera, etc.

The user may use several methods to trigger the shooting button on the page. For instance, the user may trigger the shooting button via touch, slide or double click, etc., which may not be limited here.

To facilitate subsequent processing of the video data, the obtained image may be saved as an original image. That is, the obtained image may be taken as the original image and saved.

It should be noted that the block 201 may be a sub-step of the block 102, and the block 202 may be a sub-step of the block 101. The execution sequence of the block 201 and block 202 may not be limited in this embodiment.

At block 203, the obtained image frame may be filtered using the selected first filter to obtain a processed image frame and the processed image may be added to an image set.

After the terminal obtains the processed image frame, the terminal may display the processed image frame. For instance, the terminal may render the processed image frame on the screen.

The image set may be saved in a disk file. The terminal may write the processed image frame in the disk file.

At block 204, a determination as to whether the shooting process is closed may be made.

If the shooting process is closed, block 205 may be executed. If the shooting process is not closed, block 206 may be executed.

At block 205, when the shooting process is closed, all image frames in the image set may be composed according to the sequence of the image frames to obtain a composite video and the composite video may be output.

The terminal may initiate a composing engine to compose all the image frames in the image set according to the sequence of the image frames to obtain the composite video and output the composite video.

At block 206, when the shooting process is not closed, a next image frame may be obtained and the above block of filtering the obtained image frame using the selected first filter may be executed.

Before the terminal outputs the composite video, the composite video may be displayed for preview. For instance, a preview engine may be initiated to display image frames in the composite video, so that the user may preview the composite video.

After the user previews the composite video, the user may further modify the composite video and output the composite video. That is, after the terminal displays the composite video for user's preview, the method may further include:

receiving a filter changing request and updating a filter effect in the composite video according to the filter changing request to obtain updated composite video. The method may include following processing.

The terminal may select a second filter according to the filter changing request, extract and delete the first filter in the composite video to obtain the original image frames, filter the original image frames using the second filter to obtain the updated composite video. After the original image frames are filtered using the second filter, the processed image frames may be obtained and the processed image frames may be composed to obtain the updated composite video. Block 203 and block 205 may describe the composing process.

Alternatively, when the terminal has stored the original image frames, for instance, the terminal has stored the original image frames at block 202, the process of receiving the filter changing request and updating the filter effect in the composite video according to the filter changing request to obtain the updated composite video may be executed using the following alternative method.

The second filter may be selected according to the filter changing request and the original video frames may be filtered using the second filter to obtain the updated composite video.

The process of outputting the composite video may include outputting the updated composite video.

The second filter may be configured as needed. For instance, the first filter may be configured as "documentary", "sweet", "pink" and/or "nostalgic", etc. Wherein, "documentary", "sweet", "pink" or "nostalgic" may represent a filter type. The type of the second filter may be different from that of the first filter.

Certainly, the second filter may also be configured as "none" or "original". The video obtained after the processing of the filter with the type of "none" or "original", may be the original video, which may be equivalent to that the video may not be processed with the filter.

It should be noted that the above first filter or second may perform effect processing for all of the image frames or partial of the image frames, which may be determined by the user.

To sum up, in the video generation method provided by this embodiment, during the shooting of the video, the effect processing of the static filter may be performed for the shot image frames in time to obtain the processed image frames and the processed image frames may be composed to generate the composite video. The problem of only simply presenting the shot content, but being not able to provide customized functions satisfying users' demand in the shooting process in the prior art may be solved. The effect of generating the composite video satisfying the users' demand through performing the effect processing for all the image frames or partial image frames in the shot video using the video effect template selected by the user may be achieved.

Secondly, the second scenario may be described hereinafter using the embodiment shown in FIG. 3A.

Figure 3A:
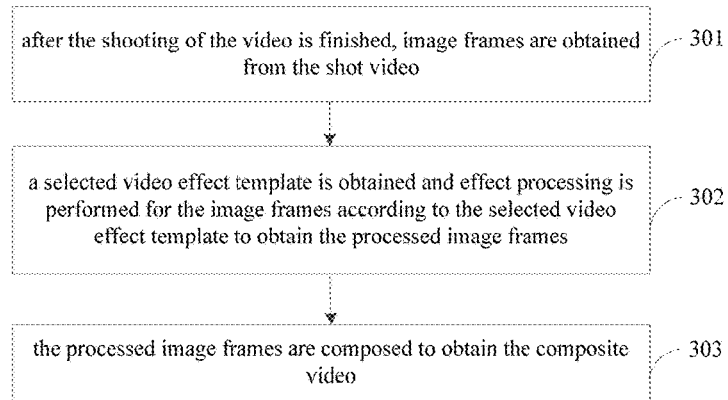
FIG. 3A is a flow chart illustrating a video generation method in accordance with another embodiment of the present disclosure.

Referring to FIG. 3A, FIG. 3A is a flow chart illustrating a video generation method in accordance with another embodiment of the present disclosure.

At block 301, after the shooting of the video is finished, image frames may be obtained from the shot video.

The video obtained after the shooting operation is finished may be the original video without any effect processing, or may be the composite video obtained via the effect processing, which may not be limited in this embodiment of the present disclosure.

The terminal may decode the video obtained after the shooting of the video is finished to obtain the image frames in sequence in the video.

Taking the video obtained after the shooting of the video is finished being the composite video for example, after the composite video is obtained, the terminal may further perform effect processing for the composite video.

At block 302, a selected video effect template may be obtained and effect processing may be performed for the image frames according to the selected video effect template to obtain the processed image frames.

The selected video effect template may be a default video effect template, or a video effect template, which may be manually selected by the user.

For instance, the terminal may obtain the video effect template via initiating an effect processing engine, and perform the effect processing for the original video or the composite video according to the video effect template.

The video effect templates may include resources, such as a description file, at least one filter and at least one foreground video. The description file may use a Jason grammar to describe information about, such as filters used by the image frames corresponding to different time points, parameters of the filters, sequence of the filters, how to exchange the frames and how to overlay the foreground video.

The different time points may be those determined by sorting the image frames according to the sequence of the image frames. The foreground video may include at least one frame of foreground image. Each frame of foreground image may correspond to a time point. Each frame of foreground image may be a foreground prop or element, such as heart or bear, which may be used to overlay onto the image frame corresponding to a corresponding time point.

When the image frame is processed using the video effect template, the description file may need to be parsed and each image frame may be respectively processed using the parsed result, a relevant filter and the foreground video.

When the effect processing of the video effect template includes the effect processing of more than one filter, the effect processing also may be called dynamic filter processing. That is, the filter used in the whole video processing process may not be limited to a single static filter. However, the image frames corresponding to different time points may use different filters, or an image frame corresponding to a same time point may use several filters, which may be overlaid together.

The filters used by different video effect templates, sequence of the filters and action time of the filters may be different. A Jason grammar template may be configured to describe attributes, such as a processing path of the filter in each video effect template, parameters of each filter, a changing rule of the parameters and action time of the filter.

Figure 3B:
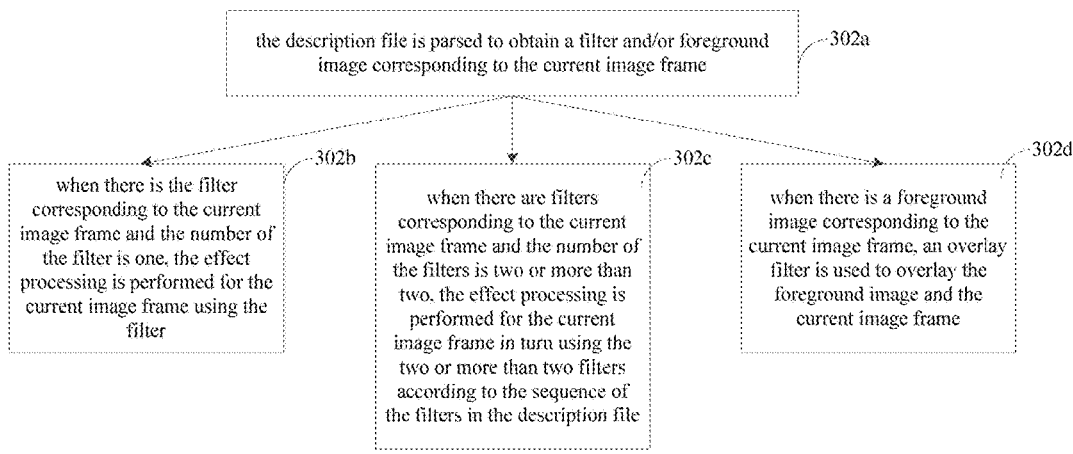
FIG. 3B is a flow chart illustrating a sub-step of block 302 in accordance with another embodiment of the present disclosure.

The block 302 may include following sub-blocks shown in FIG. 3B.

At block 302a, the description file may be parsed to obtain a filter and/or foreground image corresponding to the current image frame.

Since the description file may describe the information about, such as the filters used by the image frames corresponding to different time points, parameters of the filters, sequence of the filters, how to exchange the frames and how to overlay the foreground video. The filter and/or foreground image corresponding to the current image frame may be obtained via parsing the description file.

For instance, the first image frame to the one hundredth image frame may correspond to a first filter. The one hundredth image frame to the second hundredth image frame may correspond to a second filter, and so on and need not be repeated here.

For another instance, the first image frame may correspond to a first filter and a first frame of foreground image in the foreground video. A second frame of image may correspond to a second filter and a second frame of foreground image in the foreground video. A third frame of image may correspond to a third filter and a fourth filter. The third filter may be in front of a fourth filter. A third frame of image may correspond to a third frame of foreground image in the foreground video. A fourth frame of image may correspond to the third filter and the fourth filter. The third filter may be in front of the fourth filter. A fourth frame of image may correspond to a fourth frame of foreground image in the foreground video, and so on, and need not be repeated here.

At block 302b, when there is the filter corresponding to the current image frame and the number of the filter is one, the effect processing may be performed for the current image frame using the filter.

When there is one filter, the effect processing may be performed for the current image frame using the filter and the parameters of the filter. The parameters of the filter may include: a filter depth parameter, an action time parameter and a filter resolution parameter, etc.

At block 302c, when there are filters corresponding to the current image frame and the number of the filters is two or more than two, the effect processing may be performed for the current image frame in turn using the two or more than two filters according to the sequence of the filters in the description file.

When there are two or more than two filters, the effect processing may be performed for the current image frame in turn using the each filter and the corresponding parameters of the each filter.

At block 302d, when there is a foreground image corresponding to the current image frame, an overlay filter may be used to overlay the foreground image and the current image frame.

When there is a foreground image, the terminal may overlay the foreground image onto the foreground of the current image frame using the overlay filter.

It should be noted that the execution sequence of the block 302d and block 302b may not be limited. The block 302d may be executed before the block 302b or after the block 302b. The execution sequence of the block 302d and block 302c may not be limited. The block 302d may be executed before the block 302c or after the block 302c. Alternatively, the block 302d may be executed between the processing of the two filters in block 302c, which may not be limited in embodiments of the present disclosure.

In an exemplary embodiment, a video processing template may include: first static filter information, a foreground video and second static filter information. The block 302 may include:

Step (1): The image frame may be filtered using the first static filter information to obtain an image frame obtained after the processing of the static filter.

Figure 3C:
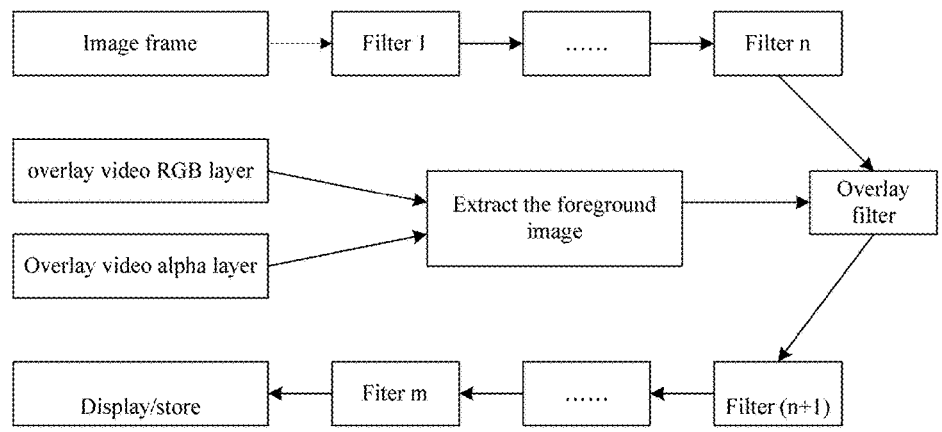
FIG. 3C is a diagram illustrating principle of the video generation method provided by the embodiment of FIG. 3A.

As shown in FIG. 3C, the first static filter information may include: multiple filters, such as filter 1, filter 2 . . . filter n, wherein n may be a positive integer, which may be larger than or equal to 1.

The first static filter information in different video effect templates may be different, for instance, the used filters, the sequence of the filters and action time of the filters may be different. That is, the types and action time of filter 1, filter 2 . . . filter n in different video effect templates may be different. For instance, as for the video effect template A, the filter 1 may be "sweet" and the action time of the filter 1 may be 4 seconds; the filter 2 may be "pink" and the action time of the filter 2 may be 5 seconds, etc. As for the video effect template B, the filter 1 may be "nostalgic" and the action time of the filter 1 may be 8 seconds; the filter 2 may be "sweet" and the action time of the filter 2 may be 3 seconds, etc.

Step (2): A foreground image may be extracted from the foreground video, the foreground image and the image frame obtained after being processed using the static filter in above step (1) may be overlaid using an overlay filter to generate an image frame overlaid with the foreground image.

For instance, an image frame of the current time point may be extracted from the current foreground video and may be taken as a foreground image. The current time point may be that corresponding to the current image frame. Then, the foreground image and the image frame obtained after being processed using the static filter in above step (1) may be overlaid using an overlay filter, and so on. The above processing may be performed for the image frames of other time points to generate the image frames overlaid with the foreground image.

The foreground video may include: an overlay video RGB (three primary colors, i.e., Red, Green and Blue) layer and an overlay video alpha layer. Corresponding image data used for overlaying may be extracted from the overly video RGB layer and the overlay video alpha layer. The extracted image data may be overlaid onto the image frames obtained after being processed using the static filter in above step (1) using the overlay filter.

It should be noted that in this embodiment of the present disclosure, as for the foreground image extracted from the foreground video, the foreground image may be taken as a kind of filter and may be overlaid with a corresponding frame, which may not be repeated. Taking the foreground video being a "drifting snow" video for example, each frame of foreground image may include snowflakes of different positions. The first frame of foreground image may be overlaid with the first frame of image, the second frame of foreground image may be overlaid with the second frame of image, the third frame of foreground image may be overlaid with the third frame of image, and the fourth frame of foreground image may be overlaid with the fourth frame of image, and so on. The foreground of drifting snow may be added to the finally-obtained composite video.

Step (3): The image frames obtained after being overlaid with the foreground image in step (2) may be filtered using the second static filter information to generate the processed image frames.

The filter mode may be similar with that in step (1). What is different from step (1) may be the processed object. What are processed in step (1) may be the previously-obtained "image frames", while what are processed in step (3) may be the "image frames overlaid with the foreground image" in step (2).

As shown in FIG. 3C, the second static filter information also may include: multiple filters, such as filter (n+1), filter n+2 . . . filter m, wherein m may be a positive integer, which may be larger than or equal to 1.

Similarly, the second static filter information in different video effect templates may be different, for instance, the used filters, the sequence of the filters and action time of the filters may be different. That is, the types and action time of filter ((n+1)), filter (n+2) . . . filter m in different video effect templates may be different. For instance, as for the video effect template A, the filter (n+1) may be "nostalgic" and the action time of the filter ((n+1)) may be 6 seconds; the filter (n+2) may be "pink" and the action time of the filter 2 may be 5 seconds, etc. As for the video effect template B, the filter ((n+1)) may be "nostalgic" and the action time of the filter (n+1) may be 3 seconds; the filter n+2 may be "sweet" and the action time of the filter n+2 may be 3 seconds, etc., which may not be repeated here.

At block 303, the processed image frames may be composed to obtain the composite video.

Then, the composite video may be displayed on the screen, or may be stored in a disk.

It should be noted that the length of the video obtained after the effect processing may be configured as needed. For instance, the length of the video may be configured as being less than 30 seconds, etc., which may not be repeated.

It should be noted that an image frame corresponding to a same time point may be processed via multiple filters, such as first processed with the filter 1 (sweet), then processed with the filter 2 (blur), and then processed with the filter 3 (adjusting contrast) . . . processed with the filter n (adjusting the position of the image), etc., which may not be repeated here.

To sum up, in the video generation method provided by this embodiment, after the shooting of the video is finished, the effect processing of the static filter may be performed for the shot image frames to obtain the processed image frames and the processed image frames may be composed to generate the composite video. The problem of only simply presenting the shot content, but being not able to provide customized functions satisfying users' demand in the shooting process in the prior art may be solved. The effect of generating the composite video satisfying the users' demand through performing the effect processing for all the image frames or partial image frames in the shot video using the video effect template selected by the user may be achieved.

Based on the embodiment shown in FIG. 2, when the shooting process is called to obtain a frame of image, a music playing process may be called to play accompaniment audio and display corresponding lyrics on the screen. That is, the user may shoot a corresponding video as he/she is singing. Then, the lyrics, accompaniment audio, audio data recorded by the user and the image frames may be composed together. That is, the method for generating the video may include:

calling the music playing process to play the accompaniment audio, displaying corresponding lyrics on the screen and using the shooting process to obtain audio data input by the user according to the accompaniment audio and lyrics.

The block 205 may include:

composing at least one of the accompaniment audio, lyrics and audio data with all the image frames in the image set to generate the composite video.

As a possible implementation mode, after the terminal composes all the image frames in the image set according to the sequence of the image frames, the terminal may compose the accompaniment audio, lyrics and the obtained audio data to generate the composite video.

Further, when the composing operation is performed, other configuration information, such as name of a song, a singer and an ending logo, etc., may be added, which may not be repeated here.

Figure 4A:
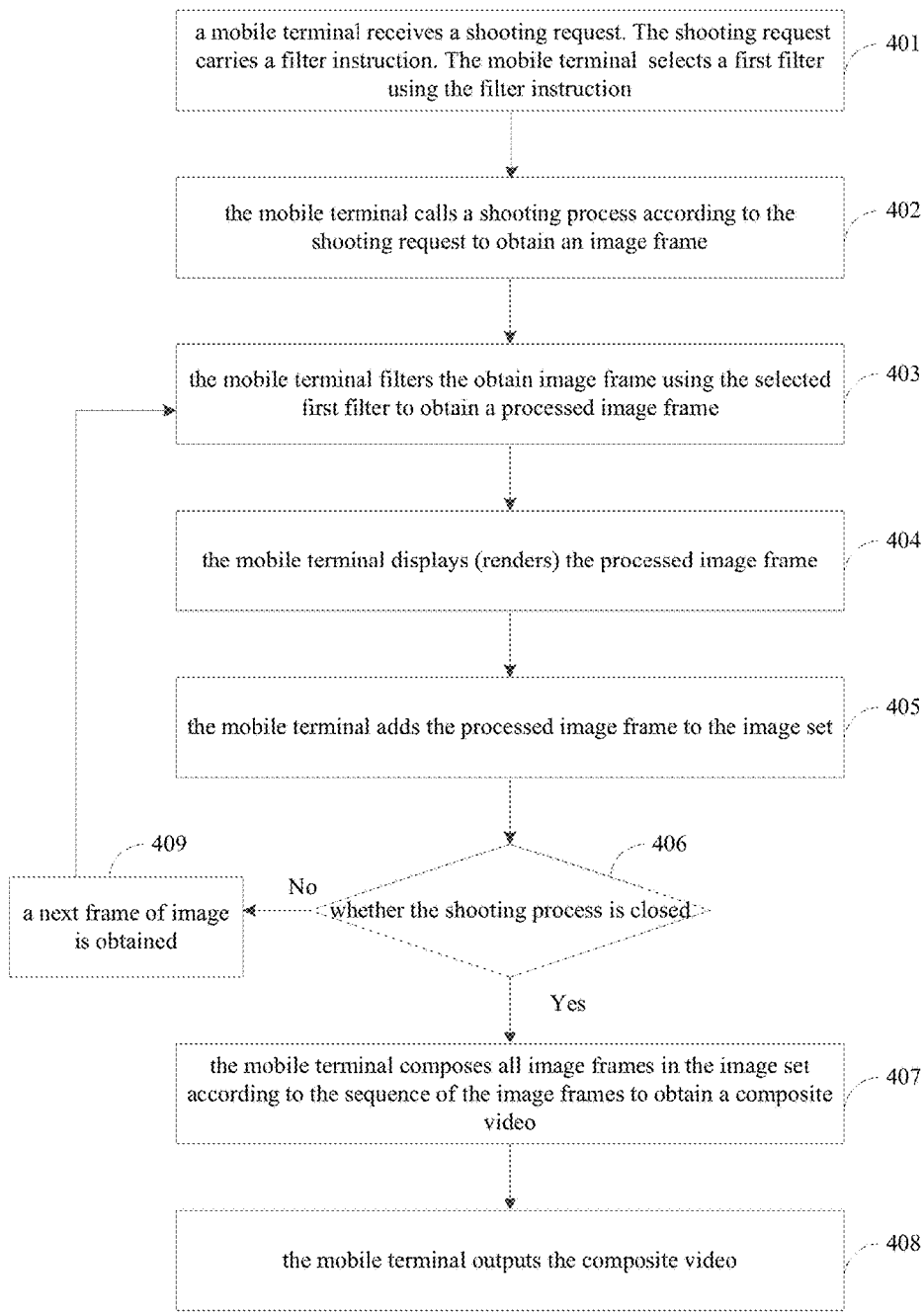
FIG. 4A is a flow chart illustrating a video generation method in accordance with another embodiment of the present disclosure.

Referring to FIG. 4A, FIG. 4A is a flow chart illustrating a video generation method in accordance with another embodiment of the present disclosure. In this embodiment, the method may be applied to a mobile terminal. The method may include following blocks.

At block 401, a mobile terminal may receive a shooting request. The shooting request may carry a filter instruction. The mobile terminal may select a first filter using the filter instruction.

For example, IDs of various kinds of filters may be displayed at the bottom of a shooting page for users' selection. When a user touches an ID of a filter and presses a shooting button (for instance, the "start to shoot" button in FIG. 4B), the shooting request carrying the filter instruction may be initiated. The filter instruction may include the ID of the filter, so that the first filter may be selected according to the ID of the filter.

Figure 4B:
FIG. 4B is a diagram illustrating an interface showing the video generation method provided by the embodiment of FIG. 4A.

The IDs of the filters may be configured as needed. For instance, as shown in FIG. 4B, the IDs of these filters may be configured as "documentary", "sweet", "pink", "pencil drawing", "past" and/or "nostalgic", etc. Certainly, the IDs of these filters may also be configured as "none" or "original". The video obtained after the processing of the filter with the type of "none" or "original", may be the original video, which may represent that the video may not be processed with the filter.

At block 402, the mobile terminal may call a shooting process according to the shooting request to obtain an image frame.

For instance, the mobile terminal may initiate a video shooting engine according to the shooting request to call a shooting process, execute the shooting process and obtain a frame of image via a camera, etc.

The user may use several methods to trigger the shooting button on the page. For instance, the user may trigger the shooting button via touch, slide or double click, etc., which may not be limited here.

To facilitate subsequent processing of the video data, the obtained image frames may be saved as an original image.

At block 403, the mobile terminal may filter the obtain image frame using the selected first filter to obtain a processed image frame.

For instance, when the first filter is "nostalgic", the obtained image frame may be filtered using the "nostalgic" filter to generate the processed image frame.

At block 404, the mobile terminal may display (render) the processed image frame.

At block 405, the mobile terminal may add the processed image frame to the image set.

At block 406, the mobile terminal may determine whether the shooting process is closed. When the shooting process is closed, block 407 may be executed. When the shooting process is not closed, block 409 may be executed.

At block 407, when the shooting process is closed, the mobile terminal may compose all image frames in the image set according to the sequence of the image frames to obtain a composite video and execute the block 408.

Figure 4C:
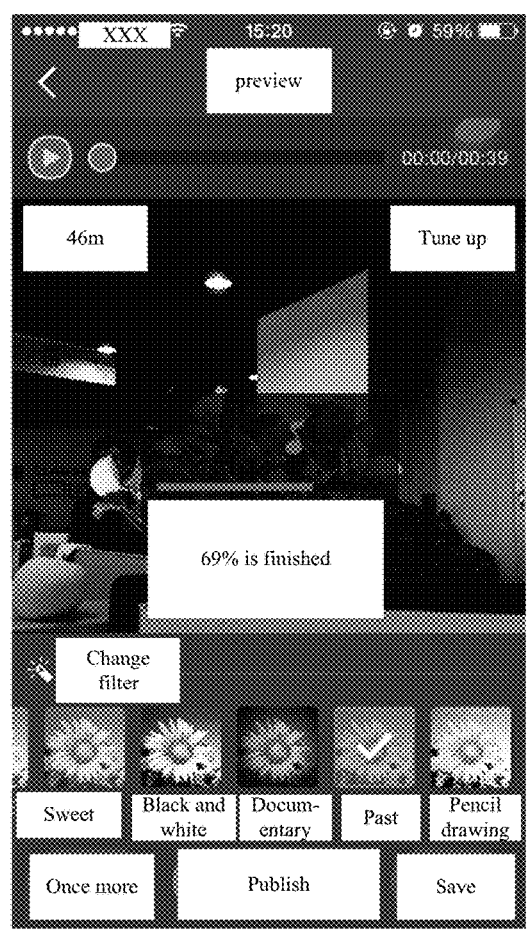
FIG. 4C is a diagram illustrating an interface showing the video generation method provided by the embodiment of FIG. 4A.

Each image frame may carry a timestamp. Therefore, the mobile terminal may compose all the image frames in the image set according to the timestamps to obtain the composite video, as shown in FIG. 4C.

The composite video may be displayed for preview. For instance, a preview engine may be initiated to display the composite video, so that the user may preview the composite video.

After the user previews the composite video, the composite video may further be modified. That is, after the terminal displays the composite video for preview, the method may further include:

receiving a filter changing request and updating the filter effect in the composite video according to the filter changing request to obtain updated composite video. The method may include following processing.

A second filter may be selected according to the filter changing request, extract and delete the first filter in the composite video to obtain the original image frames, filter the original image frames using the second filter to obtain the updated composite video.

For instance, when the first filter is "sweet", the user may wish to change the filter to "past", the user may click the ID of a filter "past" in a column of "change filter" as shown in FIG. 4C. Then, the mobile terminal may extract and delete the first filter "sweet" in the composite video to obtain the original image frames. Then, the original image frames may be filtered using the second filter "past" to obtain an updated composite video.

Alternatively, when the terminal has stored the original image frames, the original image frames may be directly obtained. That is, the operation of receiving the filter changing request, updating the filter effect in the composite video data according to the filter changing request to obtain updated composite video data may be replaced with following processing:

selecting the second filter according to the filter changing request and filtering the original image frames using the second filters to generate the updated composite video.

For instance, when the first filter is "sweet", the user may wish to change the filter to "past", the user may click the ID of a filter "past" in a column of "change filter" as shown in FIG. 4C. Then, the mobile terminal may filter the stored original image frames using the second filter "past", and compose the image frames obtained being processed with the second filter to generate the updated composite video.

At block 408, the mobile terminal may output the composite video.

For instance, when the user has not changed the filter, the composite video may be output.

For another instance, when the user has changed the filter, the updated composite video may be output.

At block 409, when the shooting of the video is not closed, a next frame of image may be obtained, the step of filtering the obtained image using the selected first filter may be executed and block 403 may be executed.

Figure 4D:
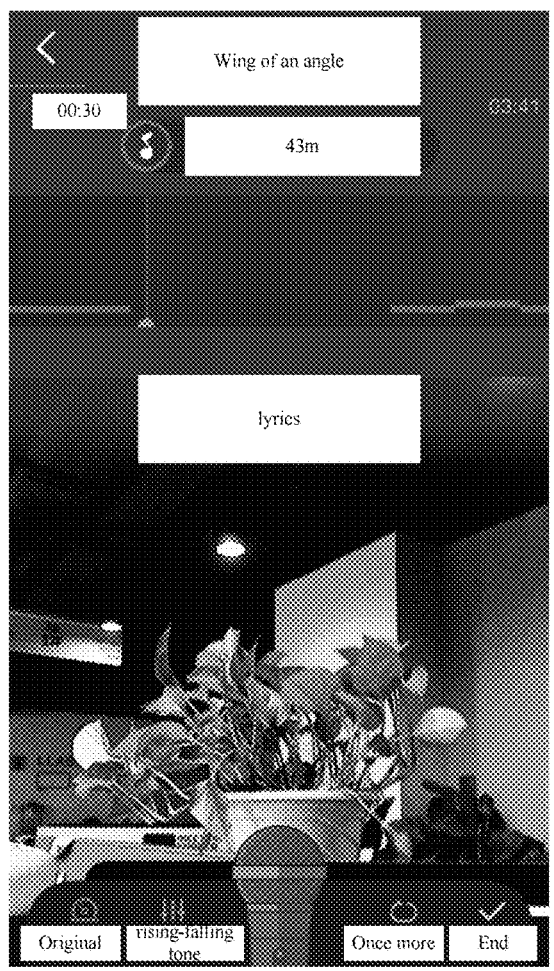
FIG. 4D is a diagram illustrating an interface showing the video generation method provided by the embodiment of FIG. 4A.

When the shooting process is called to obtain a frame of image, a music playing process may be called to play accompaniment audio and display corresponding lyrics on the screen. That is, the user may shoot a corresponding video as he/she is singing. Then, the lyrics, accompaniment audio, audio data recorded by the user and the image frames may be composed together, as shown in FIG. 4D. Further, several function options may be configured, so that the user may control a "sing" process, such as adjust volume, tune and/or progress and control the play, etc., which may not be repeated here. In some possible embodiments, the accompaniment audio may also be called accompaniment music.

On the basis of FIG. 4A, the video may further be glorified to enrich the effect of the video. The effect processing may be again performed for the composite video. After block 407, in a situation that the shooting of the composite video is finished, the method may further include:

obtaining, by the mobile terminal, a video processing template and performing effect processing for the composite video according to the video processing template.

Figure 4E:
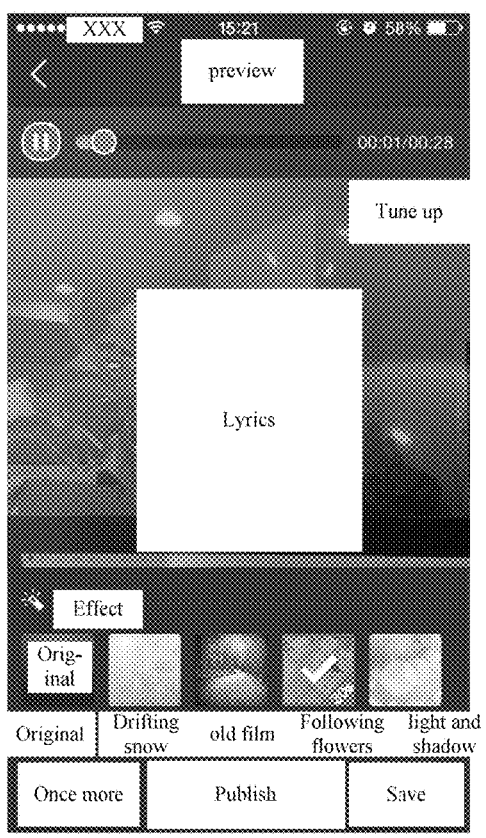
FIG. 4E is a diagram illustrating an interface showing the video generation method provided by the embodiment of FIG. 4A.

As shown in FIG. 4E, the video processing templates may include various kinds of video processing templates, such as "original", "drifting snow", "old film", "falling flowers" and/or "light and shadow". Refer to FIG. 3A and FIG. 3B for a technical scheme that the mobile terminal may process the composite video using the video processing template.

Figure 5:
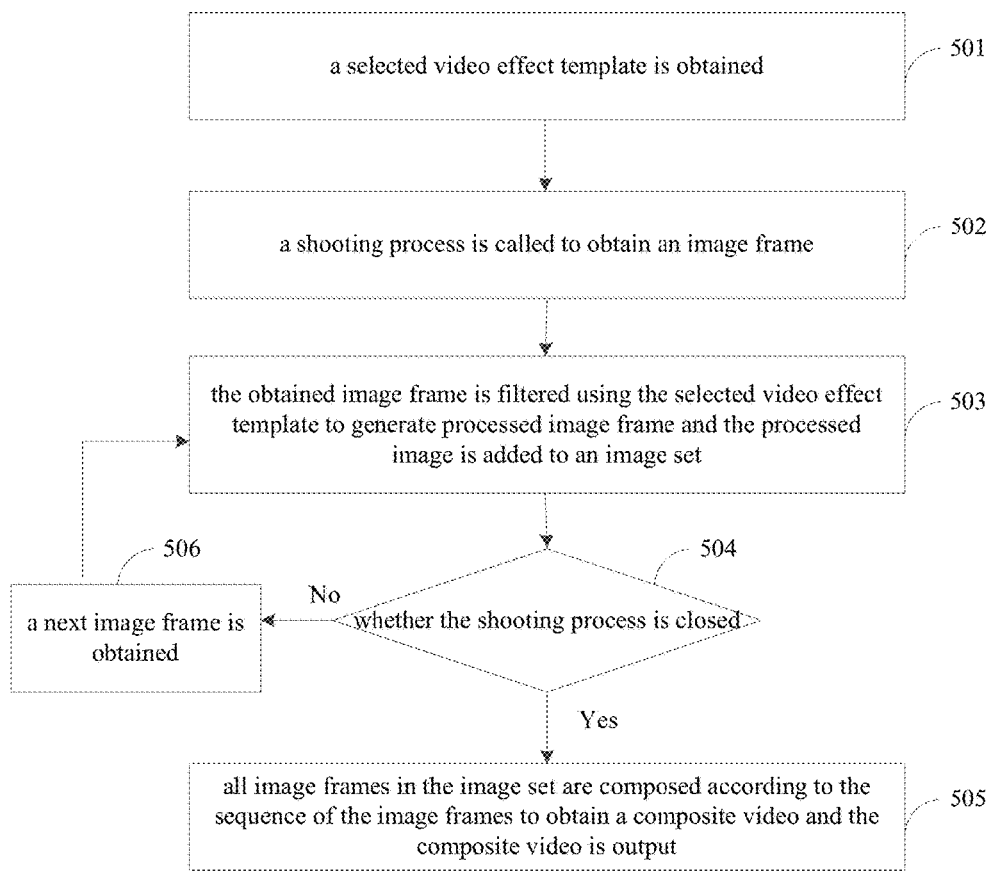
FIG. 5 is a flow chart illustrating a video generation method in accordance with another embodiment of the present disclosure.

Then, the third scenario may be described in the embodiment shown in FIG. 5.

Referring to FIG. 5, FIG. 5 is a flow chart illustrating another video generation method in accordance with another embodiment of the present disclosure.

At block 501, a selected video effect template may be obtained.

The selected video effect template may be a default video effect template, or a video effect template, which may be selected by the user.

The terminal may obtain the video effect template selected by the user via following several methods. For instance, the terminal may receive a shooting request carrying a video effect template select instruction. The shooting request may be triggered by the user, or the terminal may receive the video effect template select instruction, which is directly input by the user.

The video effect template may include at least one filter and/or at least one foreground video. Usually, the video effect template may further include a description file. The description file may be edited using Jason grammar. The description file may be used to describe the information about, such as the filters used by the image frames corresponding to different time points, parameters of the filters, sequence of the filters, how to exchange the frames and how to overlay the foreground video.

At block 502, a shooting process may be called to obtain an image frame.

The terminal may receive a shooting request, and call the shooting process to shoot an image frame.

For instance, the terminal may receive the shooting request, which may be generated in response to the triggering of the shooting button on the shooting page by the user. Then, the terminal may initiate a video shooting engine according to the shooting request to call a shooting process, execute the shooting process and obtain a frame of image via a camera, etc.

The user may use several methods to trigger the shooting button on the page. For instance, the user may trigger the shooting button via touch, slide or double click, etc., which may not be limited here.

To facilitate subsequent processing of the video data, the obtained image may be saved as an original image. That is, the obtained image frames may be taken as the original image frames and saved.

It should be noted that the block 501 may be a sub-step of the block 102, and the block 502 may be a sub-step of the block 101. The execution sequence of the block 501 and block 502 may not be limited in this embodiment.

At block 503, the obtained image frame may be filtered using the selected video effect template to generate processed image frame and the processed image may be added to an image set.

Refer to block 302 for the process of performing the effect processing for the image frame using the video effect template.

At block 504, a determination as to whether the shooting process is closed may be made.

If the shooting process is closed, block 505 may be executed. If the shooting process is not closed, block 506 may be executed.

At block 505, when the shooting process is closed, all image frames in the image set may be composed according to the sequence of the image frames to obtain a composite video and the composite video may be output.

At block 506, when the shooting process is not closed, a next image frame may be obtained and the above block of performing the effect processing for the obtained image frame using the selected video effect template to generate the processed image frame and adding the processed image frame to the image set may be executed.

To sum up, in the video generating method provided by this embodiment, during the video shooting process, the effect processing of the dynamic filter may be performed for the shot image frames to obtain the processed image frames and the processed image frames may be composed to generate the composite video. The problem of only simply presenting the shot content, but being not able to provide customized functions satisfying users' demand in the shooting process in the prior art may be solved. The effect of generating the composite video satisfying the users' demand through performing the effect processing for all the image frames or partial image frames in the shot video using the video effect template selected by the user may be achieved.

Then, the fourth scenario may be implemented by changing the shooting process in the embodiment shown in FIG. 2 to the process for reading the image frames from the video through combining the block 301, block 201, block 203 and block 205.

The above video generation method may be applied to a terminal running a sing application, a video shooting application or a video processing application. Taking a terminal, on which the sing application runs, for example, the method may include following processing.

Figure 6:
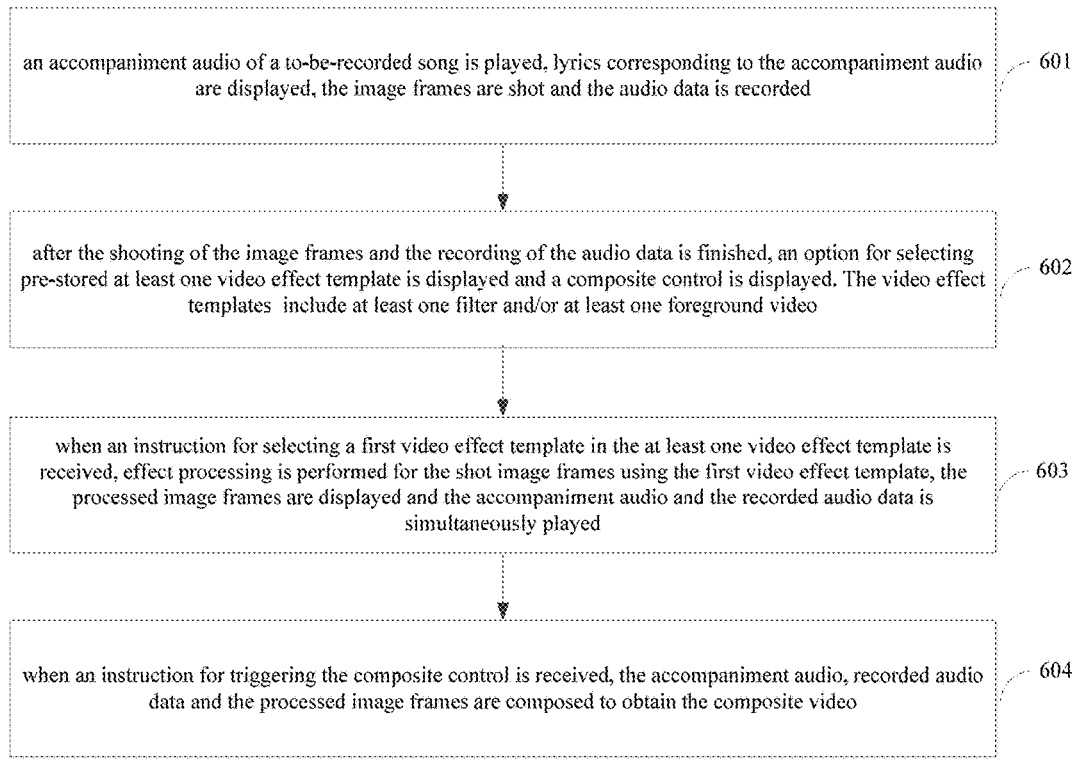
FIG. 6 is a flow chart illustrating a video generation method in accordance with another embodiment of the present disclosure.

Referring to FIG. 6, FIG. 6 is a flow chart illustrating another video generation method in accordance with another embodiment of the present disclosure. As shown in FIG. 6, the processing flow of the method may include following blocks.

At block 601, an accompaniment audio of a to-be-recorded song may be played, lyrics corresponding to the accompaniment audio may be displayed, the image frames may be shot and the audio data may be recorded.

At block 602, after the shooting of the image frames and the recording of the audio data is finished, an option for selecting pre-stored at least one video effect template may be displayed and a composite control may be displayed. The video effect templates may include at least one filter and/or at least one foreground video.

The composite control may be a virtual composite button. Alternatively, the composite control may be a menu item, etc.

At block 603, when an instruction for selecting a first video effect template in the at least one video effect template is received, effect processing may be performed for the shot image frames using the first video effect template, the processed image frames may be displayed and the accompaniment audio and the recorded audio data may be simultaneously played.

At block 604, when an instruction for triggering the composite control is received, the accompaniment audio, recorded audio data and the processed image frames may be composed to obtain the composite video.

The instruction for triggering the composite control may be a click instruction.

The processing flow shown in FIG. 6 may be described in detail hereinafter accompanying specific implementation methods.

At block 601, the accompaniment audio of the to-be-recorded song may be played, lyrics corresponding to the accompaniment audio may be displayed, the image frames may be shot and the audio data may be recorded.

The to-be-recorded song may be a song or a song clip that the user may wish to sing.

In this embodiment, the user may install a sing application on his/her terminal, operate and initiate the application. Then, the application may display a home interface and display a song request button. After the user clicks the song request button, the application may be triggered to display a corresponding song selection interface, and display a song list in the song selection interface. The user may select his/her favorite song from the song list (i.e., a target song mentioned hereinafter). The song list may display songs, which may be stored at local and have accompaniment files and may further display songs, which may be stored at the network side (i.e., the server side) and have accompaniment files. After the user selects a song from the song list, the application may take the song as a to-be-recorded song and display a song recording interface for recording the song. The song recording interface may display a record button. When the user clicks the record button, the application may be triggered to call the accompaniment file of the song, run the accompaniment file to play the accompaniment audio of the song, display lyrics corresponding to the song on the song recording interface. At the same time, the terminal may shoot an image frame via a front-facing camera of the terminal and record the audio data via microphone.

The user may select a favorite song clip from the target song and take the song clip as a to-be-recorded song. Accordingly, before block 601, following processing may be performed: determining the song clip selected by the user from the target song. Accordingly, at block 601, the accompaniment audio of the song clip may be played.

In this embodiment, after the user selects a song (i.e., a target song) from the above song list, the user may select the song clip that the user may wish to record, from the song. Then, the application may obtain the song clip selected by the user from the target song.

The user may select the song clips from the target song via following several methods.

Method one: a lyrics list of the target song may be displayed. A starting point and ending point of the song clip set by the user in the lyrics list may be obtained. The song clip selected by the user from the target song may be determined according to the starting point and the ending point.

Figure 7:
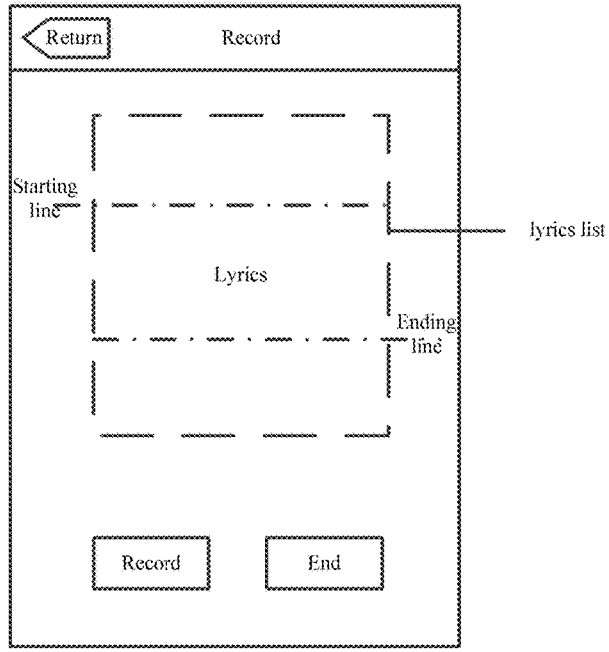
FIG. 7 is a diagram illustrating an interface showing the video generation method provided by the embodiment of FIG. 6.

In this embodiment, as shown in FIG. 7, the recording interface may display the lyrics list of the target song and may display a starting line and an ending line in the lyrics list. The use may select his/her favorite song clip by dragging the starting line and ending line up and down. The lyrics below the starting line may be starting lyrics (an opening sentence) of the song clip selected by the user, and the lyrics above the ending line may be ending lyrics (an ending sentence) of the song clip selected by the user. Then, the user may click the record button, the application may obtain a starting time point corresponding to the above starting lyrics and an ending time point corresponding to the above ending lyrics and respectively take starting time point and the ending time point as the starting point and ending point of the song clip. The song clip selected from the target song may be determined according to the starting point and ending point and accompaniment audio of the song clip may be played.

Further, in the application, upper limit of duration of the song clip, such as 30 seconds may be pre-configured. When a time interval between the above starting point and the ending point is larger than 30 seconds, the record button on the record interface may be configured as an unclickable state. Further, a lower limit of the duration of the song clip, such as 10 seconds may be pre-configured in the application. If the time interval between the above starting point and ending point is less than 10 seconds, the record button on the record interface may be configured as an unclickable state.

Method two: a playing timeline of the target song may be displayed. The starting point and ending point of the song clip set by the user on the playing time line may be obtained. The song clip selected by the user from the target song may be determined according to the starting point and the ending point.

In this embodiment, the record interface may display the playing timeline of the target song, and may display two lines on different positions of the timeline. The user may select his/her favorite song clip via dragging the two lines. After the selection is finished, the points, at which the above two lines may be located, may respectively be the starting point and ending point of the song clip selected by the user. The application may obtain the starting point and ending point of the song clip set by the user on the playing timeline, and further determine the song clip selected from the target song.

Figure 8:
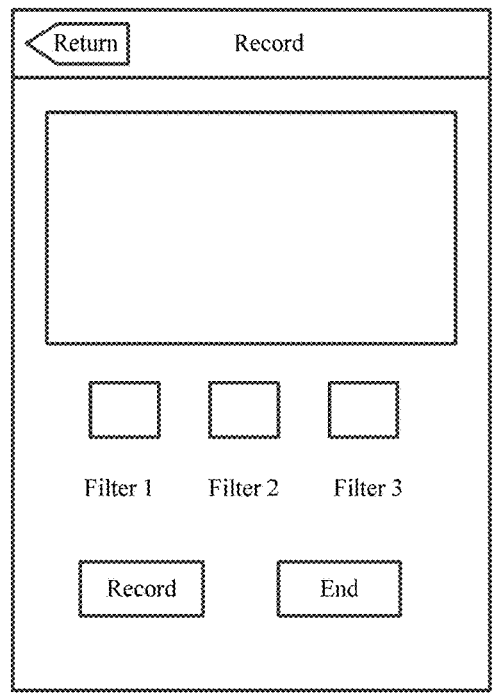
FIG. 8 is a diagram illustrating an interface showing the video generation method provided by the embodiment of FIG. 6.

Before the recording starts, options used for selecting various kinds of filters may be displayed on the recording interface. As shown in FIG. 8, the user may select one filter from the record interface and may process the shot video image in time. After selecting the filter, the user may click the record button to start to record. The application may perform image processing for each image frame according to the filter selected by the user, display the video image processed by the filter to the screen, code the video image and store the video image in the file in time.

At block 602, after the shooting of the video image and the recording of the audio is finished, the option for selecting the pre-stored at least one video effect template may be displayed and a composite control may be displayed. The video effect template may include at least one filter and/or at least one foreground video.

The video effect template may provide multiple kinds of video effects, which may be combined to process the video image. The video effect may include at least one filter, the video effect may include at least one foreground video, or the video effect may include at least one filter and at least one foreground video. The filter may be a tool used to adjust value of each pixel in the video image to achieve a specific visual effect, such as black and white filter, simple color filter. The foreground video may float on the image frame.

Figure 9:
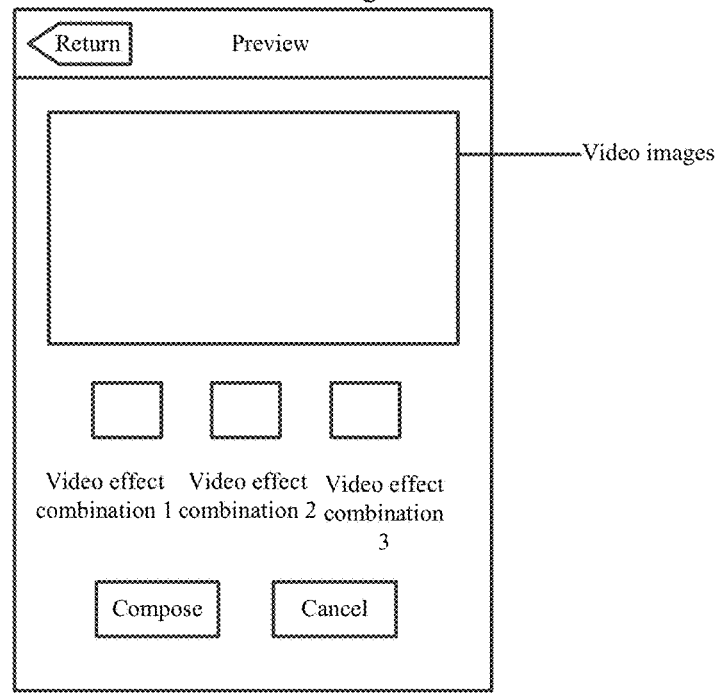
FIG. 9 is a diagram illustrating an interface showing the video generation method provided by the embodiment of FIG. 6.

In this embodiment, when the last audio frame of the accompaniment audio of the to-be-recorded song is played, or the user clicks an end button on the record interface during the playing of the accompaniment audio, the shooting of the video frame and the recording of the audio data may be terminated. The application may accordingly display a preview interface, as shown in FIG. 9, options for selecting at least one or multiple video effect templates, which may be pre-stored at local, may be displayed on the preview interface. The video effect templates may use different filters and/or foreground videos at different time intervals of the video image or use different filters and/or foreground videos at the same time interval. The above application may record processing information corresponding to each kind of video effect template. The processing information may include each filter in the video effect template, the starting time point and ending time point of the foreground video. Further, the above preview interface may display a composite button used to compose the image frames and audio data.

At block 603, when an instruction for selecting a first video effect template in the at least one video effect template is received, processing of combined effects may be performed for the shot image frames, the processed image frames may be displayed, and the accompaniment audio and recorded audio data may be simultaneously played.

In this embodiment, the user may select his/her favorite video effect template according to the options for selecting the video effect templates on the provide interface. When the user clicks one option for selecting a video effect template, the terminal may receive a selection instruction of the video effect template (i.e., the first video effect template). Then, the terminal may obtain processing information of the video effect template stored on the terminal, process image frames relating to each filter and foreground video according to each filter, the starting time point and ending time point of the foreground video in the processing information, and display the processed image frames on the screen in time.

It should be noted that referring to the above block 302 for performing the processing of combined effects for the shot image frame using the first video effect template.

When the image frames are processed, the accompaniment audio and recorded audio data may be obtained. The audio and video may be synchronously played according to the time point of each image frame and the time point of each audio frame in the accompaniment audio and recorded audio data.

When the preview interface displays options for selecting multiple video effect templates and the user selects one of the video effect templates for preview, the user may also be able to select other video effect templates for preview and eventually select his/her favorite video effect template.

At block 604, when an instruction for triggering the composite control, the accompaniment audio, recorded audio data and processed image frames may be composed to generate the composite video.

In this embodiment, after the user selects and previews the video effect template, the user may click the composite button on the preview interface. The terminal may receive a click instruction of the composite button, obtain the image frames processed with the video effect template, perform (i.e., a set of open source computer programs used to record and convert digital audio and video and covert the digital audio and video into stream) coding for the image frames. Further, the terminal may further obtain the accompaniment audio and recorded audio data, perform audio coding for the accompaniment audio and recorded audio data, to generate coded audio data, then perform composing for the coded image frames and coded audio data to generate the composite video.

The user may perform effect processing for the recorded audio data while a song is recorded. Accordingly, following processing may be performed: displaying an option for selecting at least one audio effect, performing effect processing for the recorded audio data using the first audio effect when an instruction for selecting a first audio effect from the at least one audio effect is received, and playing the processed audio data. Accordingly, the processing process of block 604 may include: when a click instruction of the composite button, composing the processed audio data, accompaniment audio and processed image frames to generate the composite video.

In this embodiment, options for selecting one or multiple audio effects, such as baby doll voice and gramophone may be displayed on the above preview interface. The user may select his/her favorite audio effect (i.e., the first audio effect) from the displayed audio effects. Then, the terminal may receive an instruction for selecting the audio effect, perform effect processing for the recorded audio data according to the selected audio effect, and play the processed audio data on the preview interface for users' preview. After the user selects the audio effect and previews the audio effect, the user may click the composite button on the preview interface to trigger the terminal to obtain the coded image frames. Further, the terminal may obtain accompaniment audio and processed audio data, code the accompaniment audio and processed audio data to generate coded audio data, perform composing for the coded image frames and coded audio data to generate the composite video.

Figure 10:
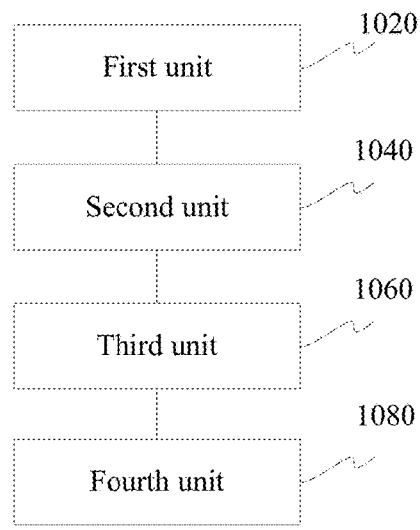
FIG. 10 is a diagram illustrating a video generation device in accordance with an embodiment of the present disclosure.

Referring to FIG. 10, FIG. 10 is a diagram illustrating a video generation device in accordance with an embodiment of the present disclosure. The video generation device may be a terminal or part of a terminal in a format of software, hardware or combination thereof. The terminal may run a sing application, a video shooting application or a video processing application. The device may include:

a first unit 1020, configured to obtain image frames from a video during shooting of the video or after the shooting of the video is finished;

a second unit 1040, configured to obtain a selected video effect template, which may include at least one filter and/or at least one foreground video;

a third unit 1060, configured to perform effect processing for the image frames according to the selected video effect template to generate processed image frames;

and a fourth unit 1080, configured to compose the processed image frames to generate a composite video.

The first unit 1020 may be further configured to call a shooting process to obtain an image frame.

The second unit 1040 may be further configured to obtain a filter instruction, and select a first filter according to the filter instruction.

The third unit 1060 may be further configured to filter the obtained image frame using the selected first filter to generate a processed image frame, display the processed image frame, add the processed image frame to an image set, determine whether the shooing process is closed, obtain a next image frame when the shooting process is not closed, and return to filter the obtained image frame using the selected first filter.

The fourth unit 1080 may be further configured to compose all image frames in the image set according to sequence of all the image frames to generate the composite video and output the composite video when the shooting process is closed.

The third unit 1060, further configured to receive a filter changing request;

the fourth unit 1080, further configured to update filter effect in the composite video according to the filter changing request to generate an updated composite video; and the fourth unit 1080, further configured to output the updated composite video.

The third unit 1060 may be further configured to select a second filter according to the filter changing request;

the third unit 1060 may be further configured to extract and delete the first filter from the composite video to generate original image frames;

the fourth unit 1080 may be further configured to filter the original image frames using the second filter to obtain the updated composite video.

The third unit 1060 may be further configured to select a second filter according to the filter changing request; and the fourth unit 1080 may be further configured to filter pre-stored original image frames using the second filter to generate the updated composite video.

The video effect template may further include: a description file. The description file may describe filters and/or foreground images in the foreground video corresponding to the image frames of different time points, and the time points may be determined according to sequence of the image frames.

The third unit 1060, further configured to parse the description file to obtain a filter and/or foreground image corresponding to a current image frame;

when there is one filter corresponding to the current image frame, perform the effect processing for the current image using the filter;

when there are two or more than two filters corresponding to the current image frame, perform the effect processing for the current image frame using the two or more than two filters according to sequence of the filters indicated by the description file;

when there is a foreground image corresponding to the current image frame, overlay the foreground image and the current image frame using an overlay filter.

The video effect template may include first static filter information, the foreground video and second static filter information.

The third unit 1060 may be further configured to filter the image frames using the first static filter information to generate image frames processed with a static filter.

The third unit 1060 may be further configured to extract a frame of foreground image corresponding to a current time point from the foreground video, and overlay the foreground image and the image frames processed with the static filter to generate video data overlaid with the foreground image.

The third unit 1060 may be further configured to filter the image frames overlaid with the foreground image using the second static filter information to generate the processed image frames.

The first unit 1020 may be further configured to call a music playing process to play an accompaniment audio and display corresponding lyrics on a screen.

The first unit 1020 may be further configured to obtain audio data input by a user according to the accompaniment audio and the lyrics using the shooting process.

The fourth unit 1080 may be further configured to compose all the image frames in the image set and at least one of the accompaniment audio, lyrics and the audio data to generate the composite video.

The second unit 1040 may be further configured to after obtaining the image frames, display an option for selecting at least one pre-stored video effect template and display a composite control. The video effect template may include: at least one filter and/or at least one foreground video.

The third unit 1060 may be further configured to perform processing of combined effects for the image frames to generate the processed image frames when an instruction for selecting a first video effect template from the at least one video effect template is received.

The fourth unit 1080 may be further configured to compose the processed image frames to generate the composite video when an instruction for triggering the composite control is received.

The first unit 1020 may be further configured to play an accompaniment audio of a to-be-recorded song, display lyrics corresponding to the accompaniment audio, shoot the image frames and record audio data.

The fourth unit 1080 may be further configured to compose the accompaniment audio, the audio data and the processed image frames to generate the composite video when the instruction for triggering the composite control is received.

The second unit 1040, further configured to display an option of at least one audio effect;

the third unit 1060, further configured to perform effect processing for the audio data using the first audio effect when an instruction for selecting a first audio effect from the at least one audio effect is received;

the fourth unit 1080, further configured to compose the accompaniment audio, the processed audio data and the processed image frames to generate the composite video when the instruction for triggering the composite control is received.

Figure 11:
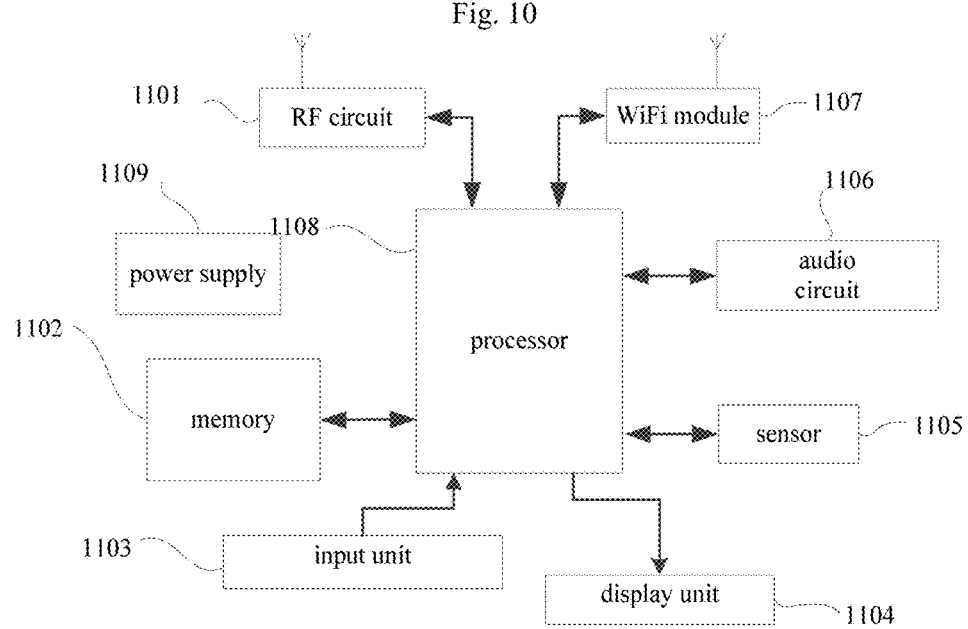
FIG. 11 is a diagram illustrating a terminal in accordance with an embodiment of the present disclosure.

Referring to FIG. 11, an embodiment of the present disclosure may further provide a mobile terminal. The mobile terminal may include an RF (Radio Frequency) circuit 1101, a memory 1102 including one or more machine-readable storage media, an input unit 1103, a display unit 1104, a sensor 1105, an audio circuit 1106, a Wireless Fidelity (WiFi) module 1107, a processor 1108 including one or more processing cores, a power supply 1109, and/or other components. It is well known to an ordinary skilled in the art of the present disclosure that the structure of the terminal device shown in FIG. 11 cannot limit the mobile terminal in embodiments of the present disclosure. The mobile terminal in the embodiments of the present disclosure may include more or less components than those in FIG. 11. In another example, the mobile terminal in embodiments of the present disclosure may consist of combination of some components or different component layouts.

The RF circuitry 1101 may be used to send and receive information or send and receive a signal during communication. In particular, after receiving downlink information from a base station, such information can be processed by the one or more processors 1108. Furthermore, the data related to the uplink can be sent to the base station. Generally, the RF circuit 1101 can include, but be not limited to, an antenna, at least one amplifier, a tuner, one or more oscillators, user identity module (SIM) card, a transceiver, a coupler, LNA (i.e., Low Noise Amplifier), duplexer, etc. In addition, the RF circuitry 1101 may communicate with other devices via a wireless communication network. The wireless communication may use any communication standards or protocols, including but not limited to, GSM (Global System for Mobile Communications), GPRS (General Packet Radio Service), CDMA (Code Division Multiple Access), WCDMA (Wideband Code Division Multiple Access), LTE (Long Term Evolution), e-mail, SMS (Short Messaging Service), etc.

The memory 1102 can be used for storing software programs and modules. By running software programs and modules stored in the memory 1102, the processor 1108 can perform various functional applications and data processing. The memory 1102 can include a program storage area and a data storage area. The program storage area can store the operating system, applications (such as sound playback, image playback, etc.) required by at least one function. The data storage area can store data (such as audio data, phone book, etc.) created when using the mobile terminal. In addition, the memory 1102 may include a high-speed random access memory, a non-volatile memory, such as at least one disk memory, flash memory, and/or other volatile solid-state memory elements. Accordingly, the memory 1102 may further include a memory controller to provide the processor 1108 and the input unit 1103 with access to the memory 1102.

The input unit 1103 can be used to receive inputted numeric or character information, and to generate signal input of keyboard, mouse, joystick, and trackball or optical signal input related to the user settings and function controls. Specifically, the input unit 1103 may include a touch sensitive surface and other input device(s). The touch-sensitive surface, also known as a touch screen or touch panel, may collect touch operations that a user conducts on or near the touch-sensitive surface. For example, a user may use a finger, a stylus, and any other suitable object or attachment on the touch-sensitive surface or on an area near the touch-sensitive surface. The touch-sensitive surface may drive a connecting device based on a preset program. The touch sensitive surface may include a touch detection device and a touch controller. The touch detection device can detect user's touch position and detect a signal due to a touch operation and send the signal to the touch controller. The touch controller can receive touch information from the touch detection device, convert the touch information into contact coordinates to send to the processor 1108, and receive commands sent from the processor 1108 to execute. Furthermore, the touch sensitive surface can be realized by resistive, capacitive, infrared surface acoustic wave, and/or other types of surface touch. In addition to the touch sensitive surface, the input unit 1103 may also include other input device(s). Specifically, the other input device(s) may include, but be not limited to, a physical keyboard, function keys (such as volume control buttons, switch buttons, etc.), a trackball, a mouse, an operating lever, or combinations thereof.

The display unit 1104 can be used to display information inputted by the user, information provided to the user, and a variety of graphical user interfaces of the mobile terminal. These graphical user interfaces can be formed by images, text, icons, videos, and/or any combinations thereof. The display unit 1104 may include a display panel configured by, e.g., LCD (Liquid Crystal Display), OLED (Organic Light-Emitting Diode), etc. Further, the touch sensitive surface may cover the display panel. When the touch sensitive surface detects a touch operation on or near the touch sensitive surface, the touch operation can be sent to the processor 1108 to determine a type of the touch operation. Accordingly, the processor 1108 can provide visual output on the display panel. Although in FIG. 11 the touch-sensitive surface and the display panel are shown as two separate components to achieve input and output functions, in some embodiments, the touch sensitive surface and the display panel can be integrated to perform input and output functions.

The mobile terminal may further include at least one sensor 1105, such as optical sensors, motion sensors, and other suitable sensors. Specifically, the optical sensors may include an ambient optical sensor and a proximity sensor. The ambient optical sensor may adjust brightness of the display panel according to the brightness of ambient light. The proximity sensor can turn off the display panel and/or turn backlighting, when the mobile terminal moves to an ear. As a type of motion sensor, a gravity sensor may detect amount of an acceleration in each direction (e.g., including three axis) and detect magnitude and direction of gravity when in stationary. The gravity sensor can be used to identify phone posture (for example, switching between horizontal and vertical screens, related games, magnetometer calibration posture, etc.), vibration recognition related functions (e.g., pedometer, percussion, etc.), etc. The mobile terminal can also be configured with, e.g., a gyroscope, a barometer, a hygrometer, a thermometer, an infrared sensor, and/or other sensors.

The audio circuit 1106, the speaker, and the microphone may provide an audio interface between the user and mobile terminal. The audio circuit 1106 may transmit an electrical signal converted from the received audio data to the speaker to convert into audio signal output. On the other hand, the microphone can convert the collected sound signal to an electrical signal, which can be received by the audio circuit 1106 to convert into audio data. The audio data can be output to the processor 1108 for processing and then use the RF circuit 1101 to transmit to, e.g., another terminal. Alternatively, the audio data can be output to the memory 1102 for further processing. The audio circuitry 1106 may also include an earplug jack to provide communications between the peripheral headset and the mobile terminal.

The WiFi may belong to a short distance wireless transmission technology. The mobile terminal may use the WiFi module 1107 to help users send and receive emails, browse websites, access streaming media, etc. Although the WiFi module 1107 is shown in FIG. 5, it can be understood that the WiFi may not be a necessary component of the mobile terminal and may be omitted without changing the essential scope of the present disclosure.

The processor 1108 can be a control center of the mobile terminal: using a variety of interfaces and circuits to connect various parts, e.g., throughout a mobile phone; running or executing software programs and/or modules stored in the memory 1102; calling the stored data in the memory 1102; and/or performing various functions and data processing of the mobile terminal to monitor the overall mobile phone. The processor 1108 may include one or more processing cores. In an exemplary embodiment, the processor 1108 may integrate an application processor with a modulation and demodulation processor. The application processor is mainly used to process an operating system, user interface, and applications. The modulation and demodulation processor is mainly used to deal with wireless communications. In various embodiments, the modulation and demodulation processor may or may not be integrated into the processor 1108.

The mobile terminal may further include a power supply 190 (such as a battery) to power various components of the terminal. In an exemplary embodiment, the power supply can be connected to the processor 1108 via the power management system, and thus use the power management system to manage charging, discharging, and/or power management functions. The power supply 1109 may also include one or more DC or AC power supplies, a recharging system, a power failure detection circuit, a power converter or inverter, a power status indicator and/or any other suitable components.

Although not shown, the mobile terminal can further include a camera, a Bluetooth module, etc. without limitation. The processor 1108 in the mobile terminal may run the one or more programs stored in the memory 1102 to implement the video generation methods in each of the above embodiments.

It can be understood by a person skilled in the art of the present disclosure that all or partial of the blocks in the above methods may be implemented by hardware instructed by the applications. The applications may be stored in a computer readable storage. The storage may include: Read Only Memory (ROM), Random Access Memory (RAM), disk or Compact Disc (CD), etc.

The video data processing method and device may be described in detail hereinbefore. The principle and implement modes of the present disclosure may be described with several embodiments. The above embodiments may only be used to assistant in understanding the methods and core idea of the present disclosure. Any modification made to the specific embodiments and application scope according to the idea of the present disclosure may not be considered to limit the present disclosure.

What is claimed is:

1. A video generation method comprising:
   obtaining image frames from a video during shooting of the video or after the shooting of the video is finished;
   obtaining a selected video effect template, which comprises at least one filter and/or at least one foreground video;
   performing effect processing for the image frames according to the selected video effect template to generate processed image frames; and
   composing the processed image frames to generate a composite video;
   wherein the video effect template comprises: first static filter information, the foreground video, and second static filter information, wherein performing the effect processing for the image frames according to the selected video effect template comprises:
   filtering the image frames using the first static filter information to generate image frames processed with a static filter;
   extracting a frame of foreground image corresponding to a current time point from the foreground video, overlaying the foreground image and the image frames processed with the static filter to generate video data overlaid with the foreground image; and
   filtering the image frames overlaid with the foreground image using the second static filter information to generate the processed image frames.

2. The method according to claim 1, wherein obtaining the image frames during the shooting of the video comprises:
   calling a shooting process; and
   obtaining an image frame.

3. The method according to claim 2, wherein obtaining the selected video effect template comprises: obtaining a filter instruction, and selecting a first filter according to the filter instruction;
   wherein performing the effect processing for the image frames according to the selected video effect template to generate processed image frames comprises:
   filtering the obtained image frame using the selected first filter to generate a processed image frame, displaying the processed image frame, adding the processed image frame to an image set, determining whether the shooing process is closed, obtaining a next image frame when the shooting process is not closed, returning to filter the obtained image frame using the selected first filter.

4. The method according to claim 3, wherein composing the processed image frames to generate the composite video comprises:
   when the shooting process is closed, composing all image frames in the image set according to sequence of all the image frames to generate the composite video and outputting the composite video.

5. The method according to claim 3, further comprising:
   receiving a filter changing request;
   selecting a second filter according to the filter changing request; and
   filtering pre-stored original image frames using the second filter to generate the updated composite video.

6. The method according to claim 2, wherein calling the shooting process and obtaining a frame of image frame comprises:
   calling a music playing process to play an accompaniment audio and displaying corresponding lyrics on a screen; and
   obtaining audio data input by a user according to the accompaniment audio and the lyrics using the shooting process;
   wherein composing all the image frames in the image set according to sequence of all the image frames to generate the composite video and outputting the composite video comprises: composing all the image frames in the image set and at least one of the accompaniment audio, lyrics and the audio data to generate the composite video.

7. The method according to claim 1, wherein the video effect template further comprises: a description file, the description file describes filters and/or foreground images in the foreground video corresponding to the image frames of different time points, and the time points are determined according to sequence of the image frames;
   wherein performing the effect processing for the image frames according to the selected video effect template to generate processed image frames comprises:
   parsing the description file to obtain a filter and/or foreground image corresponding to a current image frame;
   when there is one filter corresponding to the current image frame, performing the effect processing for the current image using the filter;
   when there are two or more than two filters corresponding to the current image frame, performing the effect processing for the current image frame using the two or more than two filters according to sequence of the filters indicated by the description file; and
   when there is a foreground image corresponding to the current image frame, overlaying the foreground image and the current image frame using an overlay filter.

8. The method according to claim 1, wherein obtaining the selected video effect template comprises:
   after obtaining the image frames, displaying an option for selecting at least one pre-stored video effect template and displaying a composite control, wherein the video effect template comprises: at least one filter and/or at least one foreground video;
   wherein performing the effect processing for the image frames according to the selected video effect template to generate processed image frames comprises:

when an instruction for selecting a first video effect template from the at least one video effect template is received, performing processing of combined effects for the image frames to generate the processed image frames; and wherein composing the processed image frames to generate the composite video comprises:

when an instruction for triggering the composite control is received, composing the processed image frames to generate the composite video.

9. The method according to claim 8, wherein obtaining the image frames after the shooting of the video is finished comprises:

playing an accompaniment audio of a to-be-recorded song, displaying lyrics corresponding to the accompaniment audio, shooting the image frames and recording audio data;

wherein when the instruction for triggering the composite control is received, composing the processed image frames to generate the composite video comprises:

when the instruction for triggering the composite control is received, composing the accompaniment audio, the audio data and the processed image frames to generate the composite video.

10. The method according to claim 9, further comprising:
displaying an option of at least one audio effect;
when an instruction for selecting a first audio effect from the at least one audio effect is received, performing effect processing for the audio data using the first audio effect; and wherein when the instruction for triggering the composite control is received, composing the accompaniment audio, the audio data and the processed image frames to generate the composite video comprises:

when the instruction for triggering the composite control is received, composing the accompaniment audio, the processed audio data and the processed image frames to generate the composite video.

11. A terminal, comprising: one or multiple processors and a storage, wherein the storage stores one or multiple programs, the one or multiple programs are executed by the one or multiple processors, and the one or multiple programs comprise instructions for executing following operations:

obtaining image frames from a video during shooting of the video or after the shooting of the video is finished;

obtaining a selected video effect template, which comprises at least one filter and/or at least one foreground video;

performing effect processing for the image frames according to the selected video effect template to generate processed image frames; and composing the processed image frames to generate a composite video;

wherein the video effect template comprises: first static filter information, the foreground video and second static filter information, wherein the one or multiple programs further comprise instructions for executing following operation:

filtering the image frames using the first static filter information to generate image frames processed with a static filter;

extracting a frame of foreground image corresponding to a current time point from the foreground video, overlaying the foreground image and the image frames processed with the static filter to generate video data overlaid with the foreground image; and filtering the image frames overlaid with the foreground image using the second static filter information to generate the processed image frames.

12. The terminal according to claim 11, wherein the one or multiple programs further include instructions for executing following operations:

calling a shooting process and obtaining an image frame.

13. The terminal according to claim 12, wherein the one or multiple programs further include instructions for executing following operations:

obtaining a filter instruction, and selecting a first filter according to the filter instruction; and filtering the obtained image frame using the selected first filter to generate a processed image frame, displaying the processed image frame, adding the processed image frame to an image set, determining whether the shooing process is closed, obtaining a next image frame when the shooting process is not closed, returning to filter the obtained image frame using the selected first filter.

14. The terminal according to claim 13, wherein the one or multiple programs further include instructions for executing following operations:

when the shooting process is closed, composing all image frames in the image set according to sequence of all the image frames to generate the composite video and outputting the composite video.

15. The terminal according to claim 13, wherein the one or multiple programs further comprise instructions for executing following operations:

receiving a filter changing request;
selecting a second filter according to the filter changing request;
extracting and deleting the first filter from the composite video to generate original image frames; and
filtering the original image frames using the second filter to obtain the updated composite video.

16. The terminal according to claim 11, wherein the video effect template further comprises: a description file, the description file describes filters and/or foreground images in the foreground video corresponding to the image frames of different time points, and the time points are determined according to sequence of the image frames;

the one or multiple programs further comprise instructions for executing following operation:

parsing the description file to obtain a filter and/or foreground image corresponding to a current image frame;

when there is one filter corresponding to the current image frame, performing the effect processing for the current image using the filter;

when there are two or more than two filters corresponding to the current image frame, performing the effect processing for the current image frame using the two or more than two filters according to sequence of the filters indicated by the description file; and when there is a foreground image corresponding to the current image frame, overlaying the foreground image and the current image frame using an overlay filter.

17. The terminal according to claim 11, wherein the one or multiple programs further comprise instructions for executing following operations:

after obtaining the image frames, displaying an option for selecting at least one pre-stored video effect template and displaying a composite control, wherein the video effect template comprises: at least one filter and/or at least one foreground video;

when an instruction for selecting a first video effect template from the at least one video effect template is received, performing processing of combined effects for the image frames to generate the processed image frames; and when an instruction for triggering the composite control is received, composing the processed image frames to generate the composite video.

18. The terminal according to claim 17, wherein the one or multiple programs further comprise instructions for executing following operations:

playing an accompaniment audio of a to-be-recorded song, displaying lyrics corresponding to the accompaniment audio, shooting the image frames and recording audio data;

when the instruction for triggering the composite control is received, composing the accompaniment audio, the audio data and the processed image frames to generate the composite video.

19. A non-transitory computer-readable medium storing instructions which, when executed by one or more processors, to:

obtain image frames from a video during shooting of the video or after the shooting of the video is finished;

obtain a selected video effect template, which comprises at least one filter and/or at least one foreground video;

perform effect processing for the image frames according to the selected video effect template to generate processed image frames; and compose the processed image frames to generate a composite video;

wherein the video effect template comprises: first static filter information, the foreground video and second static filter information;

wherein the instructions are executed by the one or more processors to:

filter the image frames using the first static filter information to generate image frames processed with a static filter;

extract a frame of foreground image corresponding to a current time point from the foreground video, overlay the foreground image and the image frames processed with the static filter to generate video data overlaid with the foreground image; and filter the image frames overlaid with the foreground image using the second static filter information to generate the processed image frames.

* * * * *